United States Patent [19]

D'Angelo et al.

[11] Patent Number: 5,274,604
[45] Date of Patent: Dec. 28, 1993

[54] METHOD FOR SPATIALLY FILTERING SIGNALS REPRESENTING FORMATION AND CHANNEL ECHOES IN A BOREHOLE ENVIRONMENT

[75] Inventors: Ralph M. D'Angelo, New Fairfield; Fred E. Stanke, Redding, both of Conn.; Hung-Wen Chang, Austin; Kai Hsu, Sugar Land, both of Tex.

[73] Assignee: Schlumberger Technology Corporation, New York, N.Y.

[21] Appl. No.: 960,524

[22] Filed: Oct. 13, 1992

[51] Int. Cl.$^5$ .............................................. G01V 1/40
[52] U.S. Cl. ...................................... 367/35; 367/43; 364/422
[58] Field of Search .................. 367/25, 35, 43, 86; 181/105; 364/422

[56] References Cited

U.S. PATENT DOCUMENTS

| | | | |
|---|---|---|---|
| 4,796,237 | 1/1989 | Hutchens et al. | 367/35 |
| 4,885,722 | 12/1989 | Leland | 367/25 |
| 4,928,269 | 5/1990 | Kimball et al. | 367/35 |
| 4,951,266 | 8/1990 | Hsu | 367/25 |

OTHER PUBLICATIONS

Peacock, K. L. and Treitel, S., "Predictive Convolution Theory and Practice", *Geophysics*, 1969, vol. 34, No. 2.
Ziolkowski, Anton, "Deconvolution, Chapter 5. Signature Deconvolution," *International Human Resources Development Corporation*, 1984, pp. 99–115.
Nuttall, Albert H., "Some Windows with Very Good Sidelobe Behavior", *IEEE Transactions on Acoustics, Speech, and Signal Processing*, vol. ASSP-29, No. 1, Feb. 1981, pp. 84–91.

*Primary Examiner*—Ian J. Lobo
*Attorney, Agent, or Firm*—Marc D. Foodman; Leonard W. Pojunas

[57] ABSTRACT

A method and apparatus for spatially filtering a signal set to enhance interface echoes representing a borehole configuration. The spatial filtering technique provides information regarding the various interfaces formed between materials in the borehole environment, as well as thicknesses of the various materials present in the borehole. Further, the presence of channels formed during the cementing procedure are detected.

27 Claims, 8 Drawing Sheets

METHOD FOR SPATIALLY FILTERING SIGNALS REPRESENTING FORMATION AND CHANNEL ECHOES IN A BOREHOLE ENVIRONMENT

BACKGROUND OF THE INVENTION

The present invention relates to a method for hydraulic isolation determination of oilfield casings. More specifically, the interfaces between the various materials present in the borehole are interrogated using ultrasonic energies. The resulting signals are spatially filtered to reduce the sensitivity to the casing and increase the sensitivity of later (deeper) interfaces represented, for example, by formation reflections.

In a well completion, a string of casing or pipe is set in a wellbore and a fill material referred to as cement is forced into the annulus between the casing and the earth formation. The primary purpose of the cement is to separate oil and gas producing layers from each other and from water bearing strata. If cement fails to provide isolation of one zone from another, fluids under pressure may migrate from one zone to another, reducing production efficiency. Migration of water, in particular, produces undesirable water cutting of a producing zone and can possibly render a well non-commercial. Also, migration of hydrocarbons into aquifers is environmentally and economically undesirable. It is critical to determine whether the cement is performing its function to hydraulically secure hydrocarbon reservoirs. The term "good cement" indicates the adequate separation of zones by the cement, preventing fluid migration between the zones.

Cement failures occur in a variety of ways. For example, a complete absence of cement between the casing and the earth formation can occur. This is characterized as a gross cement failure and leads to rapid communication between zones intended to be isolated. Another type of failure arises when channeling occurs within the cement annulus between the casing and the formation. There are three commonly occurring types of channels. First, a channel which contacts the casing is referred to as a "near channel". Second, a channel which does not contact the casing is referred to as a "far channel" or a "buried channel". For a buried channel, the region between the channel and the casing is usually cement. And third, a channel occupying the entire space between the casing and the formation is referred to as either a "full channel" or a "traditional channel". All the channels described above are filled with fluids such as mud or gas and all are potential threats to hydraulic isolation.

Another condition which occurs, but which is not generally viewed as a cement failure, is known as microannulus. This condition occurs when the cement that has filled the annulus is not properly bonded to the casing resulting in a very narrow fluid-filled annulus immediately outside the casing. This annulus is very small and does not affect fluid communication between layers, effectively preserving the hydraulic security function of the cement.

A completed well includes a number of interfaces at the junctures of the differing materials within the wellbore. A first interface exists at the juncture of the fluid in the casing and the casing itself. The casing is referred to as a first material and is typically made of steel. A second interface is formed between the casing and a second material adjacent to the exterior of the casing. If cement is properly placed between the casing and the formation, providing hydraulic isolation, the second interface exists between the casing (first material) and the cement (second material). Further, a third interface exists between the cement and a third material which is the earth formation.

Imperfect cementing operations can result in a variety of interface conditions. A channel contacting the casing results in the second interface being between the casing (first material) and a fluid (second material). In this case, the third interface is formed between a fluid (second material) and the earth formation (third material) where a full channel exists. Alternatively, the third interface is formed between a fluid (second material) and the cement (third material) where a near channel exists. A channel not contacting the casing, results in the second interface being between the casing (first material) and the cement (second material) and the third interface being between the cement (second material) and a fluid (third material). Existence of a buried channel causes a potential lack of hydraulic isolation.

The problem of investigating the fill material or cement outside a casing with a tool located inside the casing has lead to a variety of cement evaluation techniques using acoustic energy. Currently, it is believed that the most significant parameter in predetermining the quality of a cement job is the centralization of the casing in the borehole. Knowing the centralization before the cementing operation would be advantageous. The opportunity exists to make this measurement while the annulus is filled with a fluid, i.e., either before cementation or after cementation before hydration. Also, this measurement could be repeated over the cure time of the cement to provide time-lapse data.

Schlumberger Technology Corporation (assignee) makes high resolution cement evaluation measurements with the Cement Evaluation Tool (CET TM) and the Ultrasonic Imager (USI TM). Both of these tools perform the same physical measurement. The casing-thickness resonance is excited, by radially propagating energy from a pulse-echo transducer (in the fluid), and the decaying, resonant "tail" of the received waveform is analyzed. For both of these tools, each spatial location measured is analyzed independently of any information from other locations.

The "head" of the received waveform is energy reflected from the inner surface of the casing. It is the earliest and highest amplitude portion of the waveform. It contains no information of materials beyond the casing. The decaying, resonant tail of the received waveform is predominantly energy which has resonated within the casing and, therefore, contains information about the casing itself and about the materials in direct contact with the casing (mud or cement). Energies reflecting from structures not contacting the casing, such as fluid-channels or the formation, are also contained within this tail, but are typically much less energetic than the dominant steel resonances. This makes the direct measurement of these later structures very difficult as the signal in the measurement window is largely controlled by changes in the casing (e.g., local thickness) or by changes in the casing/cement interface (e.g., local disbonds).

The processing schemes employed in the USI TM attempt to minimize the effects of later reflections from objects not contacting the casing to most accurately measure the casing thickness and the cement impedance.

In general, any acoustic measurement technique used on a casing-cement-formation system will result in received energy which is dominated by the casing reflections. The reflections from typical, outer structures will be relatively weaker signals.

SUMMARY OF THE INVENTION

The present invention provides a method for spatially filtering signals representing formation and channel echoes in a borehole environment obtained using any of a number of tools including, but not limited to USI TM, CBL TM, CBT TM, VDL TM, and CET TM. The resulting signals are useful for determining hydraulic isolation in oilfield casings. Spatial filtering is performed upon a set of signals representing the entire volume of the annulus between the casing and the earth formation. The filtered signals are used to characterize such parameters as cement annulus thickness and formation rugosity, and to detect fluid channels.

Interrogation of the wellbore is performed by directing acoustic energy pulses at azimuthal and depth intervals around the inside of the casing. Each pulse passes through the various materials present in the wellbore and the surrounding formation. Energy is reflected from the interfaces between the materials passing back through the materials and into the borehole where it is detected as a signal.

The present technique includes advantages over previously known methods of examining the material outside the casing in a borehole environment. This is because while the known techniques for analyzing the material beyond the casing concentrate on characterizing the interface between the casing and the material just beyond the casing, the present technique instead characterizes channels formed between the material just outside the casing and the material beyond that. The invention modifies sets of signals obtained by transmitting acoustic energy pulses at azimuthal and depth intervals around the inside of the casing. Each signal comprises interface echoes which return to a receiver inside the casing. Each echo represents acoustic energy reflected from a specific set of one or more interfaces. The present invention filters the signals to select desired echoes and reject undesired echoes, and thus permits analysis of the borehole materials to determine whether channels exist between the first material (casing) and the earth formation.

The basic advantage of a spatial filtering method in accordance with the present invention is that the signals are filtered to provide clear representation of a particular interface around the circumference of the borehole (azimuth) as well as a representation of an interface as a function of depth. The filtered signals indicate the quality of isolation achieved by the fill material or cement outside the casing. Additionally, since casing thickness can be easily measured, the present method provides an accurate measurement of a thickness of the second material.

Another aspect of the present invention involves deconvolution. By deconvolving the results obtained in the above-described filtering techniques, the various borehole materials are more clearly indicated providing an accurate display of the interfaces and channels present in the borehole.

A further understanding of the nature and advantages of the invention may be realized with reference to the remaining portions of the specification and drawings.

DETAILED DESCRIPTION OF THE PREFERRED EMBODIMENTS

Figure 1:
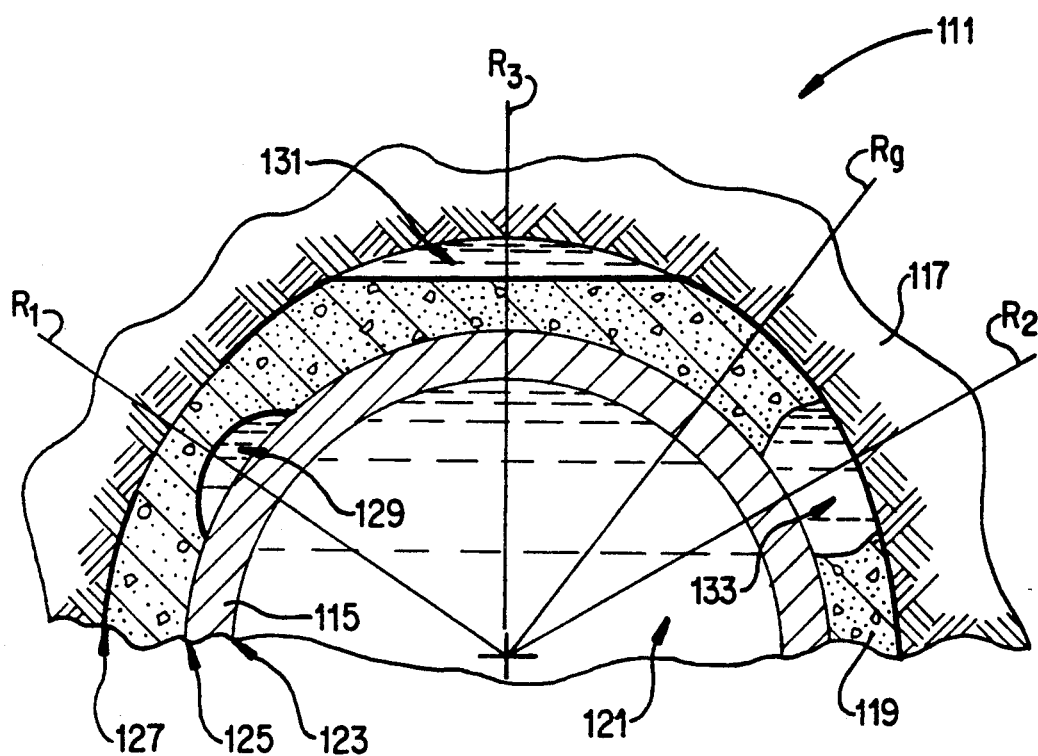
FIG. 1 is a cross-sectional diagram of a completed borehole.

FIG. 1 is a cross-sectional diagram showing materials used in a completed borehole to achieve hydraulic isolation. A borehole 111 is cased with a first material 115, typically steel pipe. Outside and adjacent to first material 115 lies a second material. Second material is usually a fill material, commonly referred to as cement, which is pumped into the annulus 119 between casing 115 and earth formation 117. The cement hydrates to retain casing 115 rigidly in position. More importantly, it fills the annulus 119 between casing 115 and earth formation 117 sealing off the hydrocarbon strata from the other layers so that when casing 115 and the cement are subsequently perforated, the hydrocarbons enter directly into casing 115 and migration of fluids between adjacent formation layers is prevented. Fluid 121, usually in the form of mud, fills casing 115 and annulus 119 before cement placement.

In accordance with the above description of borehole 111, a number of interfaces are formed between the various materials. A first interface 123 exists along the juncture between fluid 121 (usually mud) and casing 115. Ideally, second material in the form of cement completely fills the annulus 119 between casing 115 and earth formation 117. Such a situation is shown along radial line $R_g$. A second interface 125 is formed between casing 115 and cement. A third interface 127 emphasized by the bold line, exists at the juncture of cement and earth formation 117. Unfortunately, fill material or cement does not always completely fill the space between casing 115 and earth formation 117.

When cement does not completely fill the space, three possible conditions arise. The first condition is shown along radial line $R_1$. A near channel 129 exists between casing 115 and cement. Instead of second interface 125 existing between casing 115 and cement, it is formed between casing 115 and the fluid of near channel 129. In such a situation, the fluid of near channel 129 is the second material. Additionally, instead of third interface 127 existing between cement and earth formation 117, it is formed at the juncture of a fluid and cement. A full channel 133 is shown along radial line R$_2$. Full channel 133 extends completely across the annulus to earth formation 117. As in the case of near channel 129, full channel 133 also has a second interface between first material 115 and a fluid. However, the third interface for full channel 133 is between a fluid and earth formation 117.

The third condition occurs when a channel is formed in the space 119 between second material and earth formation 117. In this case, the channel does not contact first material 115. This condition is shown along radial line R$_3$ and is referred to as a buried channel 131. For such a channel, second interface 125 is formed between casing 115 and second material (cement), and third interface 127 is formed at the juncture of second material and the fluid of buried channel 131.

Figure 2:
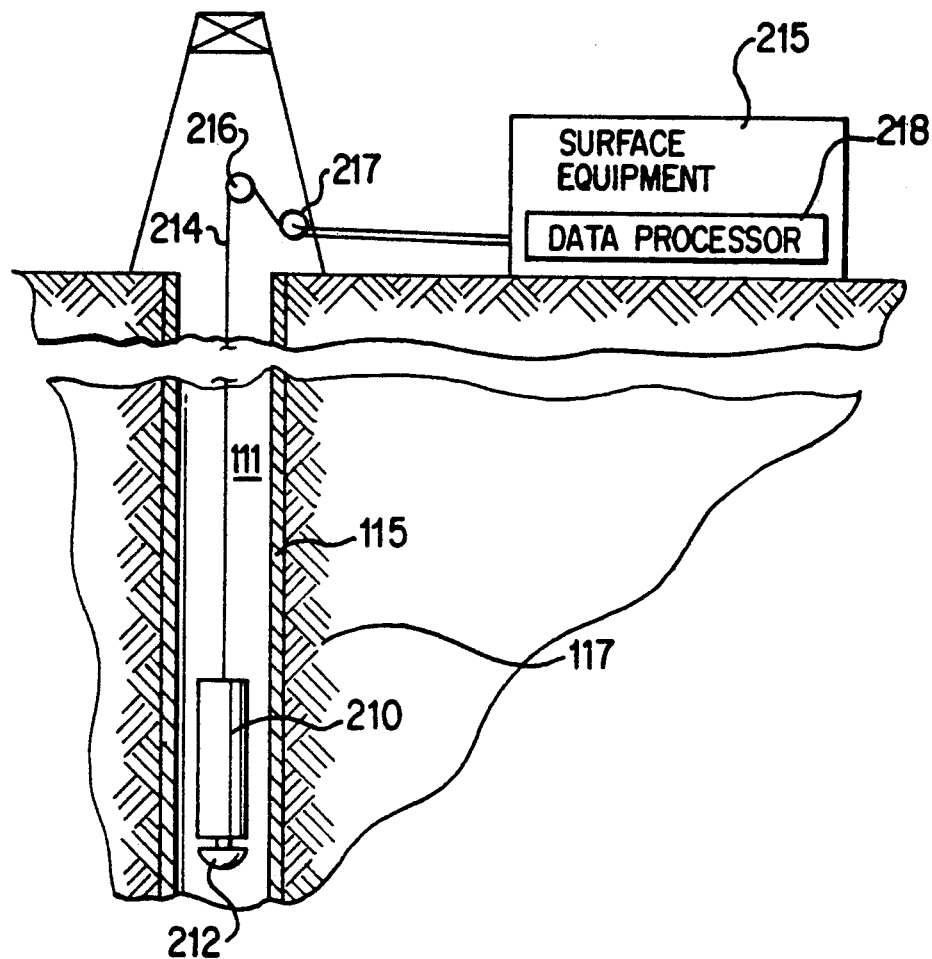
FIG. 2 is a schematic diagram of a logging operation.

FIG. 2 is a schematic diagram of a logging operation. Tool or sonde 210 for acquiring acoustic data is located in borehole 111 penetrating earth formation 117. Sonde 210 is preferably lowered in the borehole by armored multiconductor cable 214 and slowly raised by surface equipment 215 over sheave wheel 216 while data measurements are recorded in azimuthal intervals by rotating transducer 212. The depth of the tool is measured by depth gauge 217 which measures cable displacement.

Sonde 210 acquires acoustic data by emitting an acoustic pulse and detecting its return waveform. The sonde comprises at least one transducer. The transducer produces a pulse upon excitation. The pulse is directed into casing 115 and a transducer receives a resulting signal. The pulse interacts with all of the interfaces it encounters. This includes both inner and outer surfaces of the casing, both rear and far edges of the cement annulus, any fluid channel contained within the cement, and the formation surface. Due to the typical acoustic impedances and dimensions of these materials, the return signal will largely represent interaction with the casing interfaces. Representation of more distant structures such as formation or channeling, is typically of significantly lesser amplitude.

In a preferred embodiment of the tool of the present invention, the transducers 212 are mounted to rotate azimuthally and transmit and receive acoustic energy at locations around the circumference of casing 115 as they rotate and at various depths as the tool is raised or lowered in the well. The depth can be analyzed by the sonde in situ, analyzed by data processor 218 at the surface, or stored, either in the sonde or at the site for analysis at a remote location.

Figure 3A:
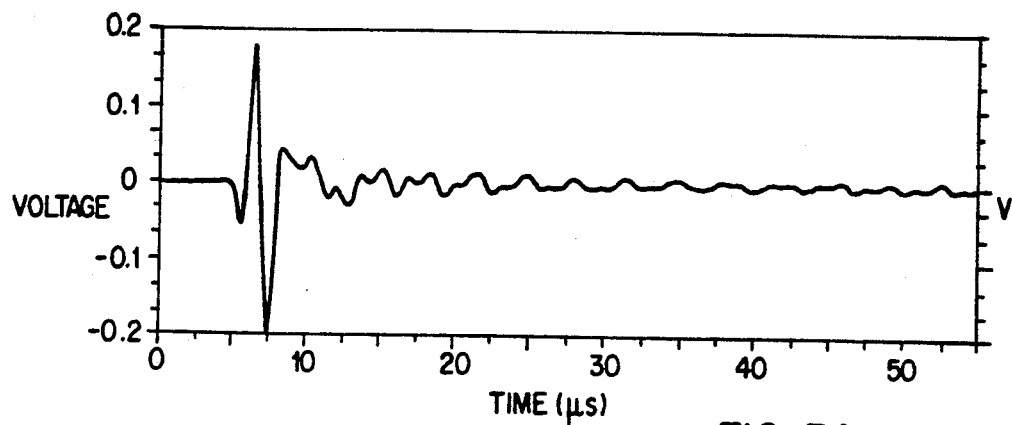
FIGS. 3A-C illustrate waveforms, V, CV, and TIV obtained from an ultrasonic cement evaluation measurement.
Figure 3B:
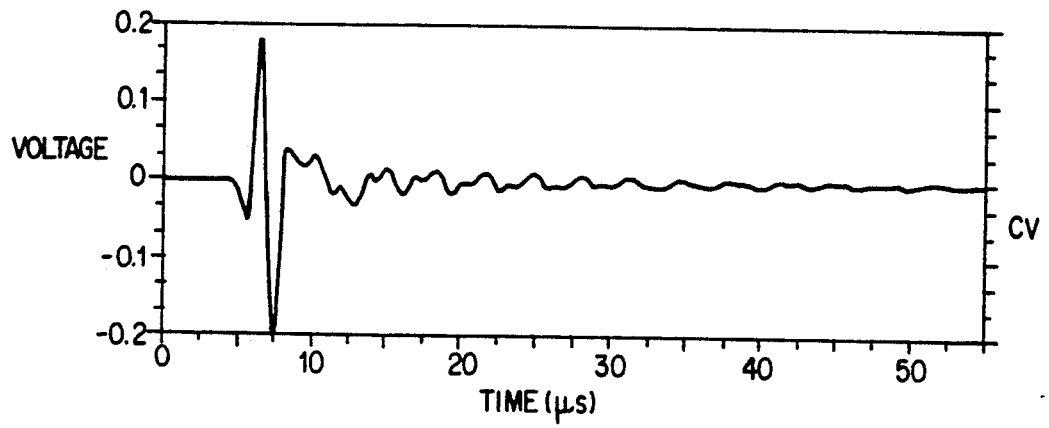
Figure 3C:
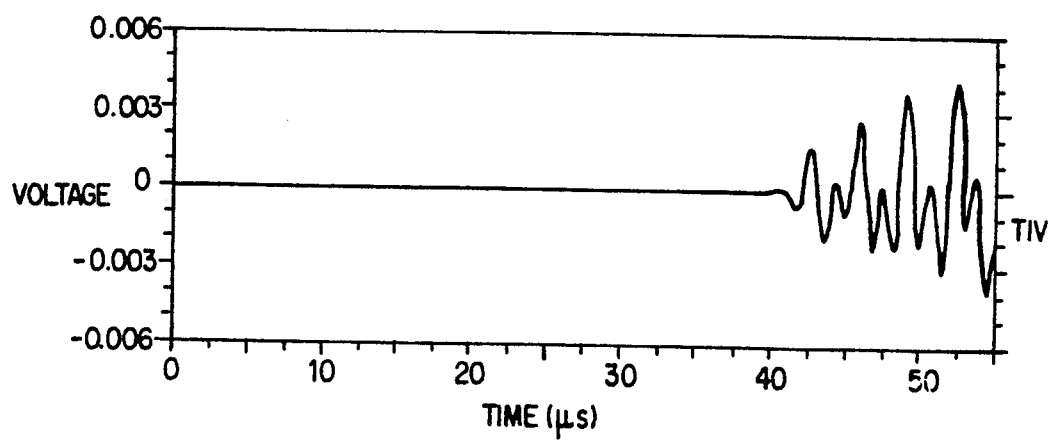

FIG. 3A is a waveform V, obtained from an ultrasonic cement-evaluation measurement taken, for example with the apparatus shown in FIG. 2. V is divided into two main portions. One portion, CV shown in FIG. 3B, represents the reflected energy which has interacted with a first interface 123 formed between casing 115 and fluid 121 and a second interface 125 formed between casing 115 and second material. The other portion, TIV shown in FIG. 3C, represents echoes which have interacted once with third interface 127 located between second material and third material 117. Multiple interactions with third interface 127 and interactions with more distant interfaces are neglected. All of the waveforms are functions of time (t) and the location at which they are collected. The location is specified in terms of azimuth ($\theta$) and depth (z). Mathematically:

$$V(t,\theta,z) = TIV(t,\theta,z) + CV(t,\theta,z) \quad (1)$$

Previous approaches to cement evaluation have concentrated on CV, because it is generally more energetic than TIV. However, this limits the techniques to measuring essentially the bonding condition at second interface 125. It is desirable to extract the "buried" TIV under certain conditions, so that more information about the annulus itself can be gained.

The first step of this method is to express TIV in mathematical form as:

$$TIV(t,\theta,z) = V(t,\theta,z) - CV(t,\theta,z) \quad (2)$$

If a casing waveform is not negligible, subtracting it from the total waveform to obtain the third-interface waveform, provides information about the annulus beyond the casing. If the casing is perfect, i.e., its inner and outer surfaces are perfect coaxial cylinders, and the exterior bonding condition is uniform (either well bonded or free-pipe), then CVs will be the same at all locations in the well. In other words, CVs are spatially invariant. Also, if the third interface is NOT a cylinder coaxial with the casing, then the reflection from the third interface will vary spatially. In this case the spatial average of all the waveforms over $\theta$ and z, AV(t), will be an approximation to CV(t):

$$AV(t) = \Sigma V(t,\theta,z)/N =$$
$$\Sigma TIV(t,\theta,z)/N + \Sigma CV(t)/N \sim CV(t) \quad (3)$$

where the sums are over $\theta$ and z, and N is the number of points in the sum. There will be N identical CVs added together, and then divided by N, so one component of the average is CV itself. If TIV is different at every location, then the value of each location will appear with a factor of 1/N in the final average. If N is large, and the different TIVs do not add coherently, then the contribution of the TIVs to the average will be small enough to neglect. An approximation to the desired third interface echo is obtained by subtracting the average from the original:

$$TIV(t,\theta,z) \approx V(t,\theta,z) - AV(t)$$

However, casings are not perfect, so the casing waveform does vary spatially (CV is CV(t,$\theta$,z)). In this case, a locally averaged waveform (over $\theta$ and z) must be calculated:

$$AV(t,\Theta,Z) = \Sigma[V(t,\theta,z)W(\theta - \Theta, z - Z)]/AW \quad (4)$$
$$= \Sigma[TIV(t,\theta,z)W(\theta - \Theta, z - Z)]/AW +$$
$$\Sigma[CV(t,\theta,z)W(\theta - \Theta, z - Z)]/AW$$
$$\sim CV(t,\Theta,Z)$$

where the sums are over $\theta$ and z, W is a spatial averaging window of finite extent whose sum is AW=$\Sigma$[W($\theta$,z)], and CV(t,$\Theta$,Z) is the waveform due to casing reverberations at the point ($\Theta$,Z). W is not equal to zero only for some range in the $\theta$ and z directions. W does not need to be uniform, in which case it will have an effective range which is less than its full range. For the approximation to be good, the effective range must be chosen large enough such that TIV(t,$\theta$,z)

varies considerably in that range and nearly cancels itself out in the average. Further, it must be small enough that $CV(t,\theta,z)$ is nearly constant over the effective range, so that the averaging does not effect it.

If the casing signal were of interest, AV could be regarded as the final product of spatial filtering. If the reflection from the third interface is of primary interest, subtracting the locally averaged signal from the original signal yields an appropriately spatially filtered signal:

$$SFV(t,\theta,Z) = V(t,\theta,Z) - AV(t,\theta,Z) \qquad (5)$$
$$= \Sigma V(t,\theta,z) [\delta(\theta - \Theta, z - Z) - W(\theta - \Theta, z - Z)/AW]$$
$$= V(t,\theta,z) * SF(\theta,z)$$
$$\sim TIV(t,\theta,Z)$$

where $\delta(\theta,z)$ is a Kronecker delta function.

This operation, which can be viewed as subtraction of a local average from the data, or as convolution (*) with the kernel SF, is one example of a spatial filter to select for TIV which has strong spatial variations over a CV which does not. This convolutional filter is a linear filter; its output consists of weighted sums of its inputs, where the weights are predetermined and do not depend on the input. It is also possible to use nonlinear filters. For example, the weights may depend on the input, or the inputs may be raised to a power, or may appear as arguments of some transcendental function, etc., as one skilled in the art will recognize.

While the window-design criteria contain potentially conflicting requirements, they can be fulfilled. The geometry of the casing can be controlled much better than the geometry of the borehole or the position of the casing within the borehole. This is especially true in new casings, before corrosion has had time to occur, and in deviated holes where centralization and cementing is problematic. Therefore, the casing waveform varies spatially less than the third-interface waveform under many practical conditions.

Practical problems exist for the application of spatial filtering. For example: some casing waveforms having fast spatial variations; and some third-interface reflections have slow spatial variations. The invention seeks to overcome these problems by applying the choice of the domain for the spatial-averaging window, W. In other words, determining whether the average includes waveforms from far away from the position of interest, or only nearby. Choosing a small window of interest, a large window of interest, or some window in between, requires the consideration of counter balancing interests. These counter balancing interests are summarized below in Table I.

TABLE I

| Counter-balancing interests of Small and Large spatial averaging windows. | |
|---|---|
| Large Window | Small Window |
| Advantage | "Sees" slow variation in the third-interface reflection | Removes fast variations in casing reflections |
| Disadvantage | Does not remove fast variations in the casing reflections | Does not "see" slowly varying casing reflections |

There are other factors which also bear on the effectiveness of a particular window. These include the shape, as well as the width of the window. The shape determines whether all waveforms in the window receive the same weight, or whether more distant waveforms have more or less effect than nearer waveforms on the average.

Figure 4:
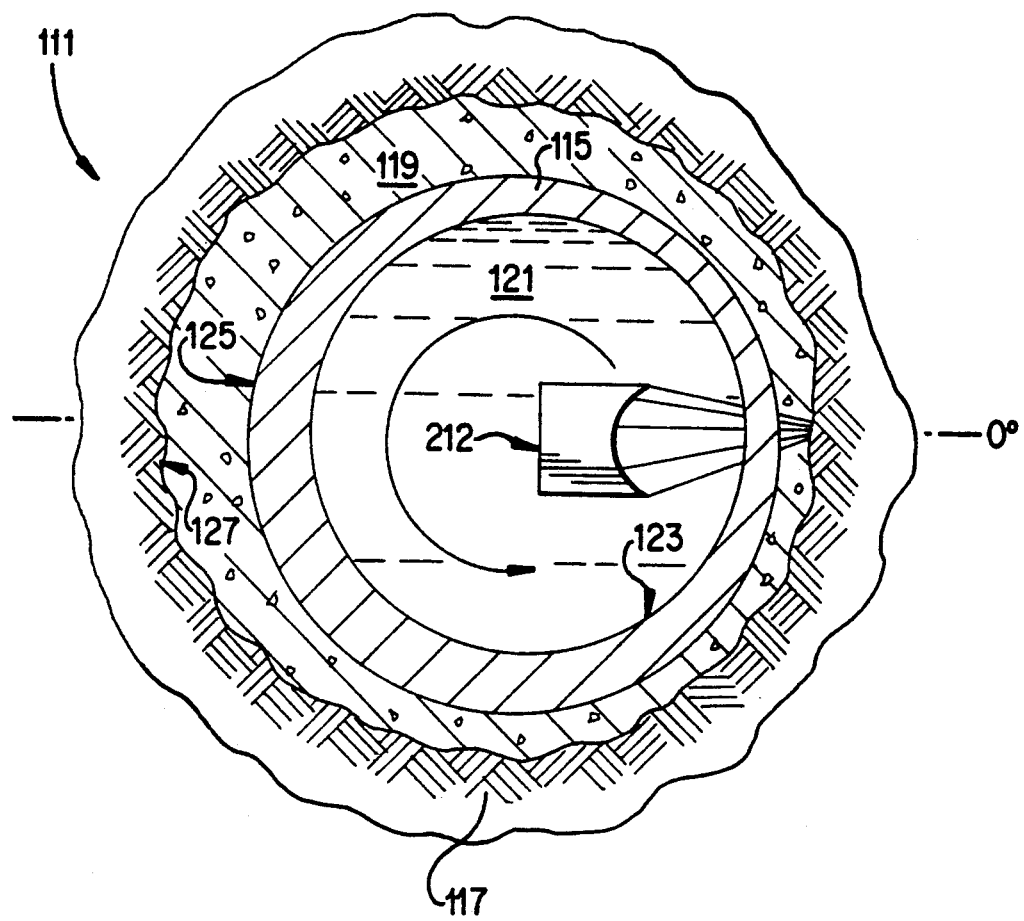
FIG. 4 is a top-view of an eccentered cased borehole wherein casing thickness varies around its circumference.

FIG. 4 is a top view of a cased borehole 111. Casing 115 varies in thickness about its circumference. A spherically focused transducer 212 is mounted in sonde 210 (FIG. 2) and is situated in fluid 121 in borehole 111. Transducer 212 rotates azimuthally around the circumference of casing 115 generating and receiving signals, such as that of FIG. 3A as it rotates.

Figure 5:
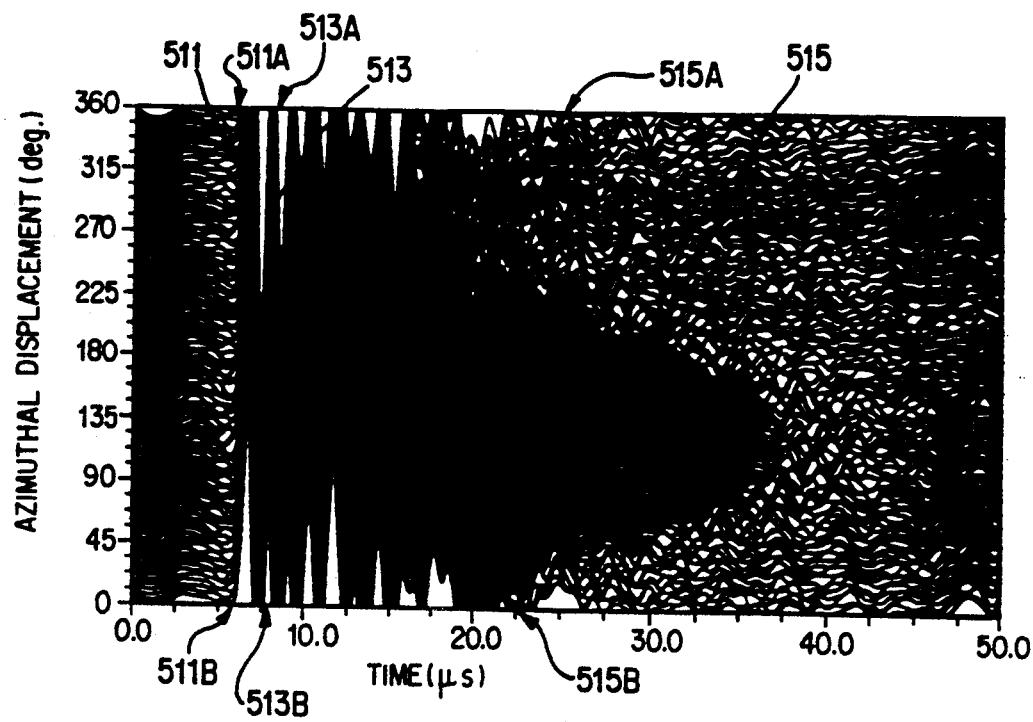
FIG. 5 is a set of signals, each obtained at a different azimuth, recorded upon generating and receiving acoustic energy in accordance with the configuration of FIG. 4.

FIG. 5 illustrates a signal set. Each signal is measured in terms of voltage as a function of time, from an individual azimuthal position obtained upon generating and receiving acoustic energy in accordance with the configuration of FIG. 4. Each individual signal is similar to the one shown in FIG. 3A. FIG. 5 permits identification of echoes from the various interfaces present in borehole 111.

The region between line 511, whose endpoints are 511A and 511B, and line 513, whose endpoints are 513A and 513B, is dominated by echoes from first interface 123 (FIGS. 1, 4). Each signal has been aligned in time by shifting so that the echoes from first interface 123 occur at the same time. Specifically, the zero crossing between the peak positive voltage and peak negative voltage has been shifted to approximately 7 $\mu$s. This removes any time shifts existing due to either minor errors in tool eccentering in the casing or non-roundness of the inside surface of the casing.

The region to the left of line 513 contains energy which has reverberated in casing 115. The frequency of reverberation is indicative of the thickness of casing 115. The region between line 513 and sinusoidally-shaped line 515, whose endpoints are 515A and 515B, is dominated by this energy which has reverberated in casing 115 without propagating beyond casing 115.

The region to the right of (later than) line 515, is a mixture of energy which has reverberated in casing 115, but not propagated beyond the casing, and energy which has reflected from third interface 125 (FIGS. 1, 4), and representing TIV. The energy to the left of line 515 is all from CV, while the energy to the right of line 515 is a mixture of CV and TIV.

Echoes between lines 511 and 513 (from first interface 123) are substantially lined up vertically because the signals have been aligned. Echoes between lines 513 and 515 (second interface 125) line up with a slight curvature as a function of azimuth indicating that thickness of casing 115 changes as a function of azimuth. Casing 115 is thinnest at about 67°, and is thickest at about 247° (180° away). Finally, line 515 oscillates between about 15 $\mu$Sec and 38 $\mu$Sec indicating a great range of distances between transducer 212 and third interface 127 formed between second material and third material 117. Although the casing thickness is relatively constant around the circumference at a particular depth, casing 115 is eccentered within the cement. This causes a sinusoidal shaped onset (beginning) of energy received from third interface 127 between the cement and earth formation 117.

Figure 6:
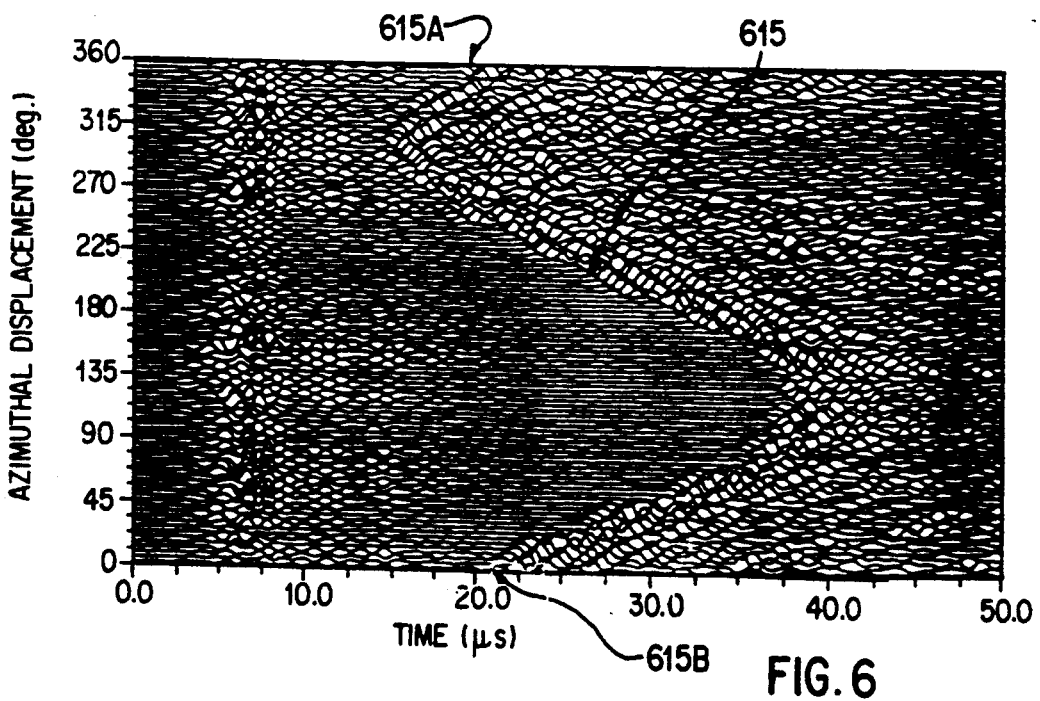
FIG. 6 is a set of signals as in FIG. 5, upon which spatial filtering has been performed.

FIG. 6 represents the same signals shown in FIG. 5 after spatial filtering has been performed. The spatial filtering operation greatly increases the clarity of the reflections from third interface 127 (TIV). In FIG. 6, this is represented by the region to the right of line 615, formed between points 615A and 615B, which substantially retains the third interface echoes while substantially removing casing reflections (CV). The sinusoidally shaped onset of echoes from the third interface between annulus 119 and earth formation 117 accurately indicates the distance between the casing and formation. The spatial filter applied to signals in FIG. 5 to obtain the result in FIG. 6 consists of subtracting the locally averaged signal $AV(t,\Theta,Z)$ from Eq.(4):

$$W(m,n) = \delta(n)\cos\widehat{}(\pi m/M) \text{ for } -M/2 \leq m \leq M/2, \text{ and} \quad (6)$$
$$= 0 \text{ elsewhere,}$$

where m is the azimuthal incremental index and n the depth incremental index. $\delta(n)$ is a Kronecker delta function. There is no averaging in the depth direction for this example so n does not appear in the equation. The total width of the window, M, is 20 azimuthal scan positions.

Figure 7A:
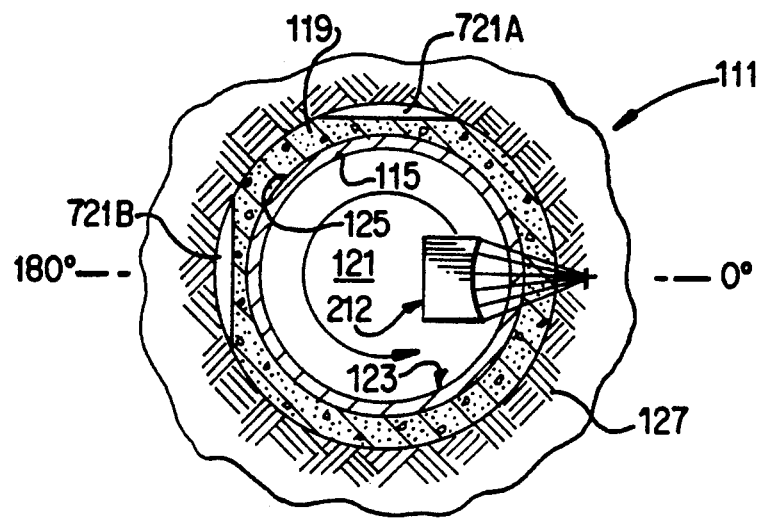
FIG. 7 is a set of signals obtained from a centered casing in a borehole (7A) and spatially filtered (7B) as in FIG. 6, with channels shown between the second interface and the third interface.
Figure 7B:
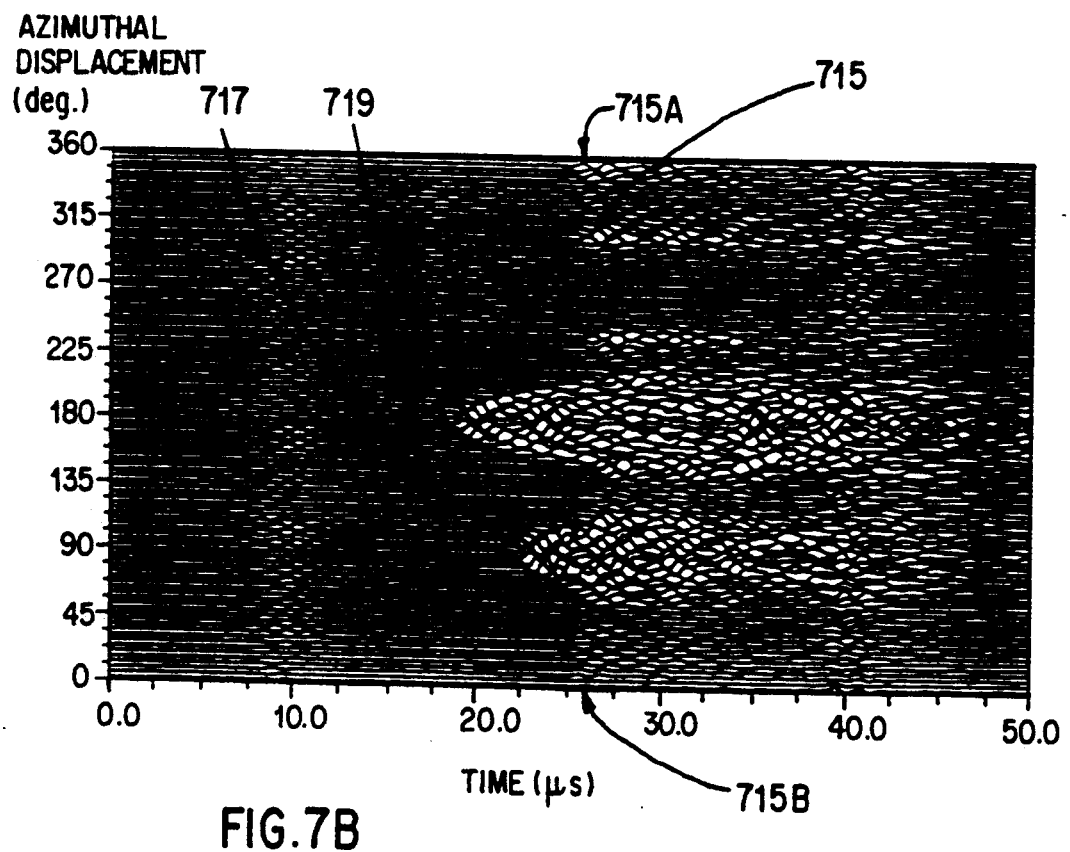

FIGS. 7A and 7B show a borehole configuration (7A) and a corresponding aligned and spatially filtered signal set representing casing 115 centered and cemented in borehole 111, with two buried channels 721A and 721B. Two types of third interface conditions exist in FIG. 7A. The first type is the cement/formation bond, at azimuths where there is no channel. The onsets of the echoes from this interface condition occur along straight line 715 between points 715A and 715B (FIG. 7B). These echoes appear only weakly because they are nearly constant in azimuth, and the filter removes azimuthally invariant echoes.

The second type of third interface condition is a cement/channel interface. Echo 717 from a first channel is centered at approximately 90° and is about 35° wide. Echo 719 from a second channel is centered at approximately 180° and is about 50° wide. At their edges, these channels are nearly the same distance from the casing as the cement/formation interface. However, as points closer to their centers are considered, third interface 127 moves closer to the casing as is seen in FIG. 7A. The echoes from the cement/channel interfaces appear strong in FIG. 7B because they are strong functions of azimuth, and thus not removed by the spatial filter. The onsets of echoes from the cement/channel interfaces accurately indicate their geometry, being simultaneous with the onsets from the cement/formation echoes at their edges, and earlier toward the centers. Thus the onsets of the cement/channel interfaces 717 and 719 form an "image" of the channels, and are important in evaluating the quality of the cement job.

Figure 8:
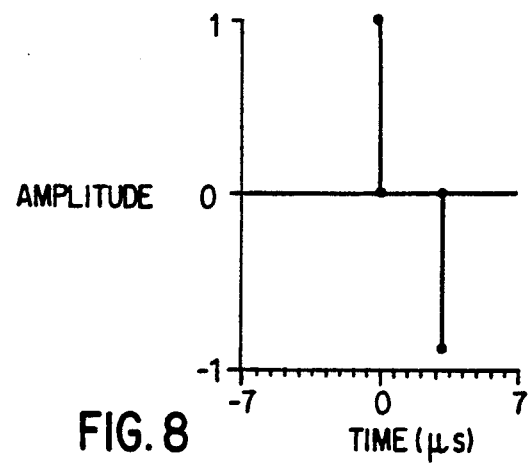
FIG. 8 is a simple deconvolution filter.
Figure 9:
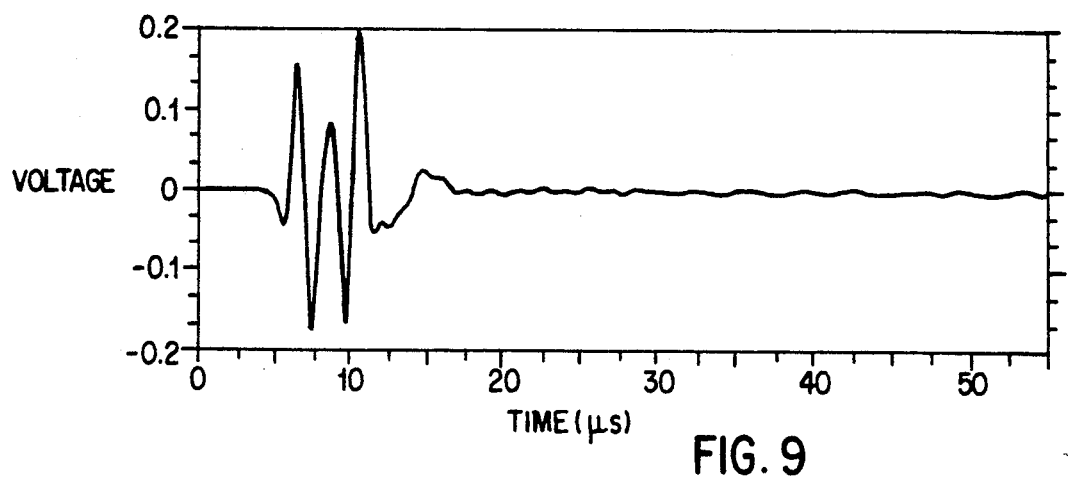
FIG. 9 is an example of a waveform.
Figure 10:
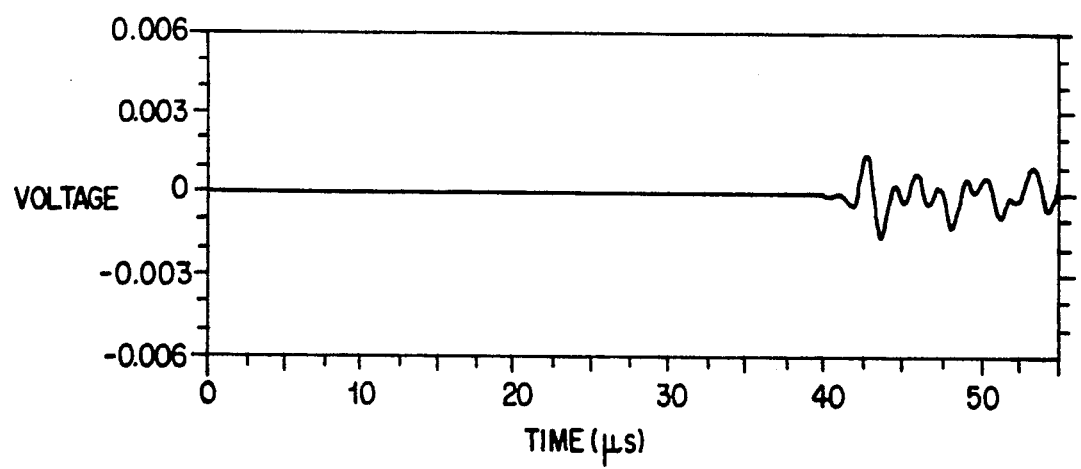
FIG. 10 is a waveform resulting from the deconvolution of the filter of FIG. 8 with the waveform of FIG. 9.

A very simple deconvolution filter is shown in FIG. 8. When this filter is convolved with the signals in FIG. 3A and 3C, it yields the desirable results in FIGS. 9 and 10, respectively. The filter has the form:

$$f_D(t) = \overline{\delta}(t) - R\overline{\delta}(t-T_O) \quad (7)$$

where the delay is:
$$T_0 = 2d/c_c \quad (8)$$

d is the thickness of the casing;
$c_c$ is its compressional acoustic velocity of the casing; and
$\overline{\delta}(t)$ is an impulse, or Dirac delta function.
R is a deconvolution factor which is less than one.
$T_0$, can be found in a number of ways, either from previously known information about casing thickness and the acoustic impedances of materials in the borehole, or from the data itself. R is approximately the decay ratio of a signal reverberating in the casing after one reverberation. There are many approaches to the latter method, one of which is to use casing thickness and second-material impedance as calculated for example, by the processing algorithm of the USI TM tool. Many different forms of a deconvolution filter are possible, and there are many ways of determining their parameters (see Peacock, K. L. and Treitel, S., Productive Convolution Theory and Practice, *Geophysics*, 1969, Vol. 34, No. 2.). In practice, the Dirac impulse, $\overline{\delta}$, which is a function of continuous time, must be approximated by some function of discrete time. The quality of the results depends on the quality of the approximation.

The total signal $V(t, \theta, z)$ of FIG. 3A is composed of three contributions which overlap in time but are affected differently by deconvolution:

$$V(t,\theta,z) = CIV(t,\theta,z) + CRV(t,\theta,z) + TIV(t,\theta,z) \quad (9)$$

$CIV(t, \theta, z)$ is the echo from the inner surface of the casing, which is essentially the high amplitude portion of $CV(t, \theta, z)$ in FIG. 3B. $CRV(t, \theta, z)$ is the casing resonance, which is essentially the later, low-amplitude portion of $CV(t, \theta, z)$ in FIG. 3B. The sum of $CIV(t, \theta, z)$ and $CRV(t, \theta, z)$ is $CV(t, \theta, z)$, the casing echo discussed above. $TIV(t, \theta, z)$ is the third-interface echo.

Deconvolution with the filter in Eq. (6) subtracts a scaled and shifted copy of the original signal from itself. The most important effect of deconvolution is to reduce the amplitude of $CRV(t, \theta, z)$ as seen by comparing FIGS. 3A and 9. Reducing the amplitude of the casing resonance generally improves the ability to examine the filtered version of $TIV(t, \theta, z)$. Another important effect of deconvolution is to cause the peak of the filtered version of $TIV(t, \theta, z)$ to occur near its onset, around 42 $\mu s$ in FIG. 10, rather than growing in amplitude as it does in FIG. 3C. Detection of the onset is the easiest means of measuring the thickness of the second material, and peak detection or related algorithms tend to be more robust than threshold detection algorithms.

Figure 11A:
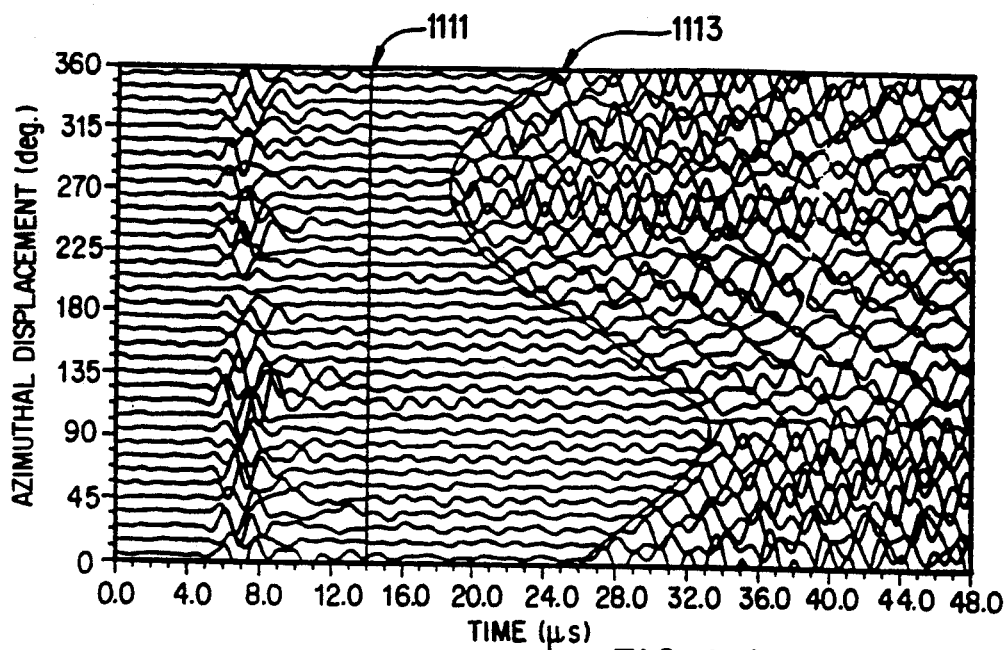
FIG. 11A is a spatially filtered set of signals representing a borehole configuration, and 11B is a spatially filtered and deconvolved set of signals.
Figure 11B:
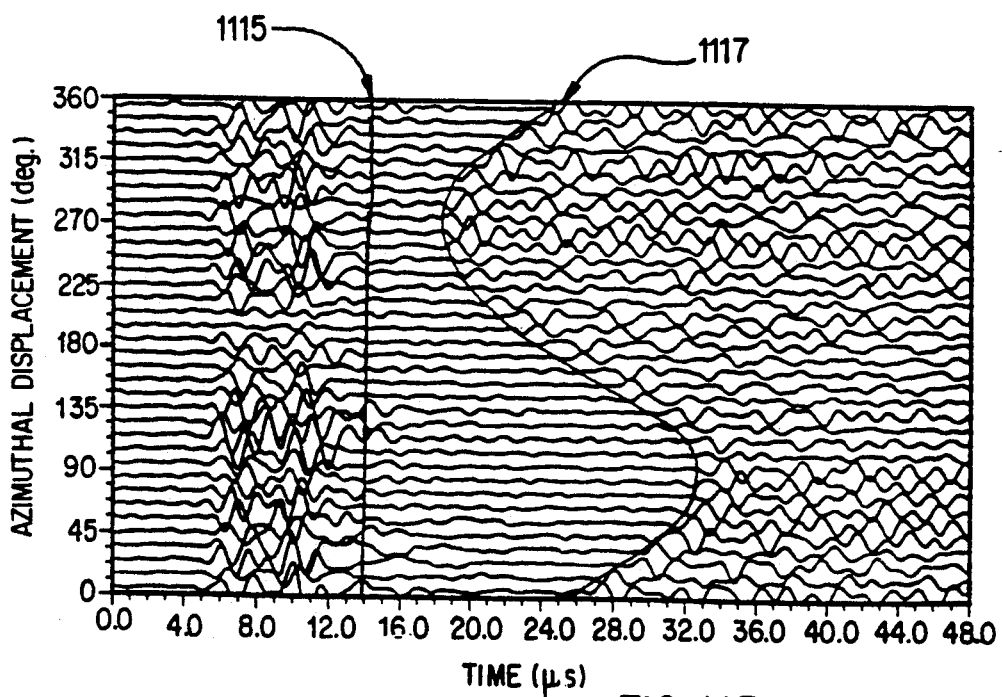

FIG. 11A shows a spatially filtered set of signals from an unfocused transducer in a borehole configured like that of FIG. 4. FIG. 11B shows the same signal set after deconvolution. In FIG. 11A, there is remnant of the casing resonance between line 1111 and sinusoidally-shaped line 1113 than between line 1115 and sinusoidally-shaped line 1117 in FIG. 11B. While the echoes immediately after (to the right of) lines 1113 and 1117 are patterned similarly, the echoes in FIG. 11A grow in amplitude at later times. In contrast, echoes in FIG. 11B generally decrease in amplitude. The remnant of the reflection from the inner surface of the casing, to the left of line 1115 lasts longer due to deconvolution, than it does to the left of line 1111.

Another aspect of the invention is its applicability to borehole measurements before hydration of fill material in the annulus between the casing and the earth formation. Such information may be useful for a number of applications including quality control of casing centralization before cement placement and/or after cement is placed but before hydration occurs. It should be understood that although the figures show aligned signal sets, it is not a requirement of the invention that the signals be aligned. In addition, the results of spatial filtering may be dependent on the spatial sampling rates and on the dynamic range of the digitized signals in the signal set. Therefore, the above description should not be taken as limiting the scope of the invention which is defined by the appended claims.

What is claimed is:

1. A method of characterizing interfaces formed between various materials in a cased borehole environment by spatially filtering a set of signals representing the various materials, comprising the steps of:

introducing acoustic energy into the cased borehole environment from a transducer in the borehole;

receiving at least two spatially distinct signals as a collection of data values including echoes representing arrivals from interfaces formed between the various materials;

recording each signal in a spatial signal set;

applying a spatial filter to at least one data value in a first signal in the spatial signal set and at least one other data value in at least one other signal in the spatial signal set to separate a first echo from at least one other echo; and providing a filtered spatial signal set.

2. The method of claim 1 wherein the spatial filter is a non-linear filter.

3. The method of claim 2 wherein the filtered signal set is analyzed to characterize interfaces formed between various materials in the borehole by determining arrival times of echoes for a particular signal.

4. The method of claim 3 wherein characterizing interfaces formed between various materials in the borehole comprises determining a thickness of a particular borehole material.

5. The method of claim 4 comprising the steps of:

measuring a time delay between an echo from a first interface and an echo from a third interface;

subtracting a known time time delay due to a casing thickness; and obtaining a time delay indicative of a thickness of a second material.

6. The method of claim 3 wherein characterizing interfaces formed between various materials in the borehole comprises determining an impedance of a particular borehole material.

7. The method of claim 2 wherein the spatial filter is applied in an azimuthal direction.

8. The method of claim 2 wherein the spatial filter is applied in a depth direction.

9. The method of claim 2 wherein the spatial filter is applied in both an azimuthal direction and a depth direction.

10. The method of claim 2 wherein the spatial filter is applied to at least one other data point in the first signal.

11. The method of claim 10 wherein deconvolution is applied to each signal in the signal set.

12. The method of claim 11 wherein deconvolution is applied to a plurality of signals in the signal set substantially simultaneously.

13. The method of claim 2 wherein the first echo comprises echoes from casing interfaces.

14. The method of claim 2 wherein at least two other data values in the signal set are averaged together to obtain a local average filter value which is subtracted from the at least one data value as the spatial filter.

15. The method of claim 1 wherein the spatial filter is a linear filter.

16. The method of claim 15 wherein the filtered signal set is analyzed to characterize interfaces formed between various materials in the borehole by determining arrival times of echoes for a particular signal.

17. The method of claim 16 wherein characterizing interfaces formed between various materials in the borehole comprises determining a thickness of a particular borehole material.

18. The method of claim 17 comprising the steps of:

measuring a time delay between an echo from a first interface and an echo from a third interface;

subtracting a known time time delay due to a casing thickness; and obtaining a time delay indicative of a thickness of a second material.

19. The method of claim 16 wherein characterizing interfaces formed between various materials in the borehole comprises determining an impedance of a particular borehole material.

20. The method of claim 15 wherein the spatial filter is applied in an azimuthal direction.

21. The method of claim 15 wherein the spatial filter is applied in a depth direction.

22. The method of claim 15 wherein the spatial filter is applied in both an azimuthal direction and a depth direction.

23. The method of claim 15 wherein the spatial filter is applied to at least one other data point from the first signal.

24. The method of claim 23 wherein deconvolution is applied to each signal in the signal set.

25. The method of claim 24 wherein deconvolution is applied to a plurality of signals in the signal set substantially simultaneously.

26. The method of claim 15 wherein the first echo comprises echoes from casing interfaces.

27. The method of claim 15 wherein at least two other data values in the signal set are averaged together to obtain a local average filter value which is subtracted from the at least one data value as the spatial filter.

* * * * *